(12) United States Patent
Khanna et al.

(10) Patent No.: US 11,356,486 B2
(45) Date of Patent: Jun. 7, 2022

(54) DYNAMIC CODE INJECTION BY POLICY ENFORCEMENT POINT

(71) Applicant: ORACLE INTERNATIONAL CORPORATION, Redwood Shores, CA (US)

(72) Inventors: Ranjan Khanna, Edina, MN (US); Chuni Lal Kukreja, Delhi (IN); Sreenivasa Chitturi, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 190 days.

(21) Appl. No.: 16/588,406

(22) Filed: Sep. 30, 2019

(65) Prior Publication Data

US 2021/0099495 A1 Apr. 1, 2021

(51) Int. Cl.
*H04W 12/06* (2021.01)
*H04L 67/01* (2022.01)
*H04L 9/40* (2022.01)

(52) U.S. Cl.
CPC ........ *H04L 63/205* (2013.01); *H04L 63/0815* (2013.01); *H04L 63/0838* (2013.01); *H04L 63/0846* (2013.01); *H04W 12/06* (2013.01); *H04L 67/42* (2013.01)

(58) Field of Classification Search
CPC ............... H04L 63/205; H04L 63/0838; H04L 63/0846; H04L 67/42; H04L 63/10; H04L 63/107; H04L 63/108; H04L 63/20; H04W 12/06
See application file for complete search history.

(56) References Cited

U.S. PATENT DOCUMENTS

2007/0220599 A1* 9/2007 Moen .................. H04L 63/0227 726/12
2020/0128085 A1* 4/2020 Khait .................... H04L 67/142

* cited by examiner

*Primary Examiner* — Edward Zee
(74) *Attorney, Agent, or Firm* — Trellis IP Law Group, PC

(57) ABSTRACT

An example method facilitates dynamic runtime execution of computer code that is selectively injected into messages in accordance with predetermined configuration rules for automatic execution at a message destination. The injection of code into messages, such as messages exchanged during an authenticated computing session, by a policy enforcement system, can be used to efficiently effectuate enhance computing environment security and computing resource use. For example, in a specific embodiment, code for detecting a browser-close event and then terminating a computing session can be automatically executed client side via a browser extension or plugin, thereby helping to eliminate the accumulation of stale computing sessions; thereby mitigating associated security risks and computing resource consumption of stale computing sessions. In another example embodiment, injected code encrypts session cookies, such as via a Time based One Time Password (TOTP).

17 Claims, 12 Drawing Sheets

DYNAMIC CODE INJECTION BY POLICY ENFORCEMENT POINT

CROSS REFERENCES TO RELATED APPLICATIONS

This application is related to the following application, U.S. patent application Ser. No. 16/164,750 (ORA180050-US-NP), entitled SECURING USER SESSIONS, filed on Oct. 18, 2018, which is hereby incorporated by reference as if set forth in full in this application for all purposes.

BACKGROUND

The present application relates to computing, and more specifically to computer network resource management, security, and adaptability to varying demands of the computing environment.

Mechanisms for enhancing the flexibility of computing environment security and resource management, including session management, are employed in various demanding applications, including Policy Enforcement Points (PEPs), session servers, and accompanying session-management software, and so on. Such applications often demand efficient mechanisms to ensure, for instance, that users operating client-side software (e.g., browsers) can securely and efficiently interact with protected remote resources, e.g., server-side resources (also called cloud-based resources herein), including web services and data managed thereby.

Emerging computing environment security threats demand increasingly efficient mechanisms for rapidly adjusting security functionality accordingly. However, conventionally, different resources of a network may lack the ability to automatically modify or update each other, e.g., in response to a threat detection or resource-consumption issue.

An example of a common security and resource management issue includes a scenario where users do not log out of their computing sessions (e.g., for instance, computing sessions established with banking websites, credit card websites, enterprise collaboration platforms, etc.), but instead close their browser window. This may cause accumulation of stale computing sessions, which can consume excess sever computing resources, as a session server maintains the stale sessions and attempts to unnecessarily sync thereto.

To address this issue, some session servers and/or accompanying PEPs will employ a short session time out interval to cause inactive sessions to quickly expire. However, this method can still result in the consumption of excess computing resources (e.g., storage and processing resources) before sessions are timed out. Furthermore, excessively short time-out intervals can be problematic for users of the websites that use authentication to facilitate access to protected server-side resources (e.g., data and/or functionality).

SUMMARY

An example method facilitates implementing dynamic runtime adjustment of computing code running in a computing environment, so as to enhance network security, and/or to increase network resource utilization efficiency. For example, using embodiments disclosed herein, code injected into a response message from a protected resource and addressed to a client-side program can be automatically executed by the client-side program during runtime to dynamically mitigate the accumulation of stale computing sessions and associated security risks. In another embodiment, the code automatically executes client-side to enable protection of Single Sign On (SSO) session cookies via creation of Time-based One Time Passwords (TOTPs) used to encrypt the SSO session cookies and related authentication information.

In an illustrative embodiment, the example method includes intercepting a message in a computing environment, resulting in an intercepted message; analyzing the intercepted message in view of context information pertaining to the intercepted message and in view of one or more network policies, including one or more configuration rules; determining, based on the analyzing, code to inject in the intercepted message; injecting the code into the intercepted message, resulting in a modified message with injected code response thereto; and then forwarding the modified message to a recipient identified by the intercepted message for automatic execution thereby.

In a more specific embodiment, the intercepted message includes a response message that is responsive to a client request message sent from a client-side application and addressed to a server-side application, where the client-side application represents the recipient. The code includes instructions to be automatically executed via the client-side application. For example, the client-side application may include a browser, and the injected code may include JavaScript that implements functionality for: detecting a browser-close event; and issuing a session-close signal to a session management system and/or policy enforcement system running server-side in response to the detecting.

The example method may further include using a policy enforcement system to intercept the message, wherein the message includes a response message from a server-side application (e.g., web service, Application Programming Interface (API), etc.). The context information may include computing session metadata, such as user role (e.g., administrator) information and message destination information (e.g., message Uniform Resource Locator (URL) data).

The policy enforcement system may include a Policy Enforcement Point (PEP) that has access to a set of configuration rules. The configuration rules may include a table indicating one or more associations identifying code to inject into the response message when a condition is met. The PEP may implement instructions for determining when the condition is met by referring to the configuration rules in combination with the context information. In another embodiment, the injected code may represent instructions for automatically encoding session information pertaining to a computing session between the recipient and a sender of the response message, wherein the automatic encoding is implemented via a TOTP.

Hence, instead of requiring manual client-side or server-side installation and configuration of plugins and other software for enhancing computing environment security and/or mitigating excess computing resource consumption, embodiments discussed herein may be used to dynamically update software behaviors (client-side and/or server-side behaviors) via injected code that is selectively injected into network messages in accordance with detected network conditions and context information, and further in accordance with adjustable configuration rules and associated network policy. This may greatly enhance computing environment security and resource consumption efficiency.

A further understanding of the nature and the advantages of particular embodiments disclosed herein may be realized by reference of the remaining portions of the specification and the attached drawings.

DETAILED DESCRIPTION OF EMBODIMENTS

Figure 1:
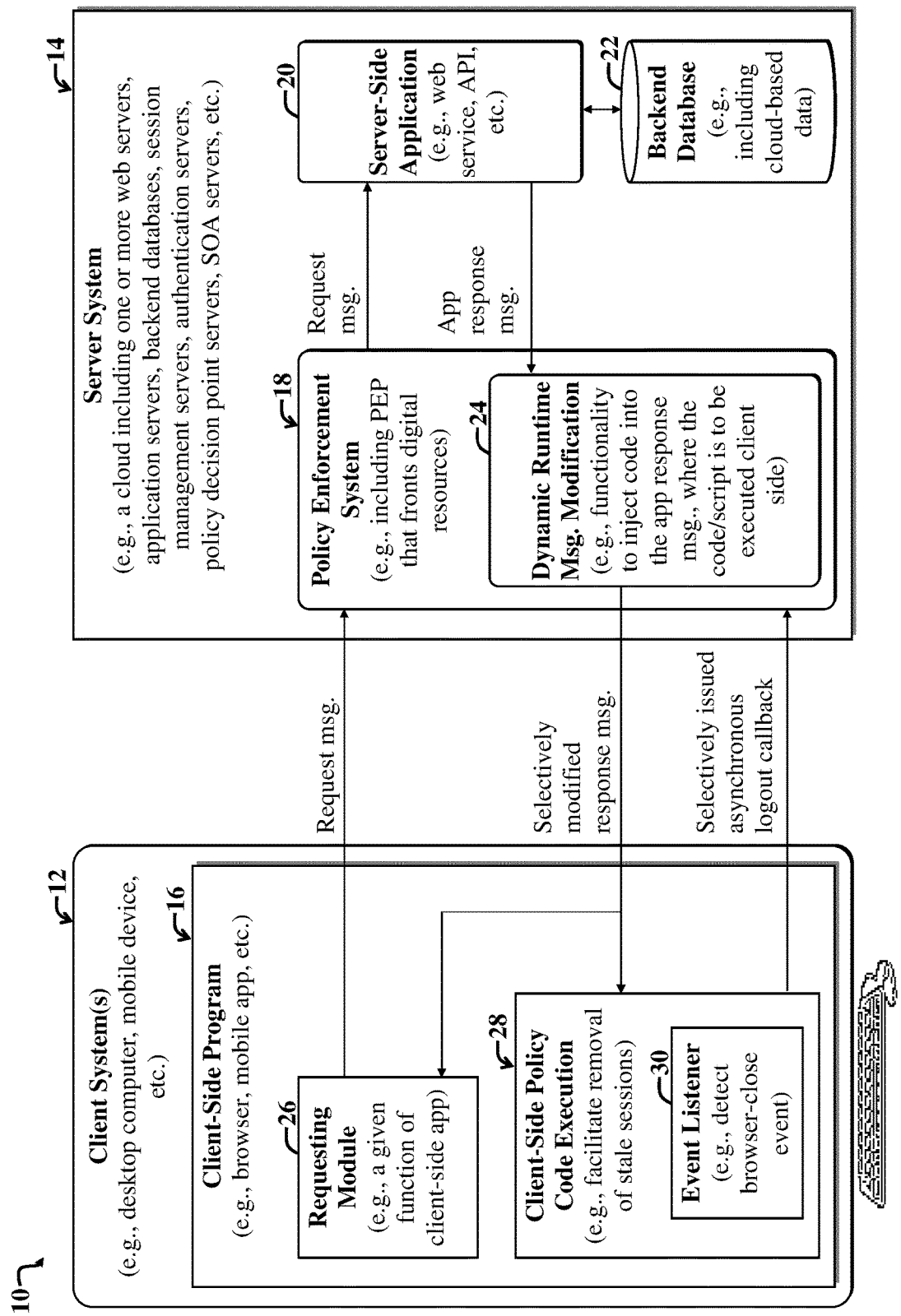
FIG. 1 illustrates a first example system and accompanying computing environment employing a policy enforcement system and accompanying dynamic runtime message modification module to selectively inject code in application response messages for client-side execution and associated enhancement of network security and resource management.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on. Enterprise computing environments are often networked computing environments.

A networked computing environment may be any computing environment that includes intercommunicating computers, i.e., a computer network. Similarly, a networked software application may be any software application (e.g., a mobile app, desktop browser plugin, etc.) that communicates with one or more computing resources via a computer network.

A given software application may include (but not necessarily) constituent software applications or modules (e.g., services, functions, procedures, computing objects, plugins, extensions, etc.). Accordingly, the term "software application" may also include networked software applications or integrated groups thereof.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

For clarity, certain well-known components, such as hard drives, processors, operating systems, power supplies, routers, Internet Service Providers (ISPs), certain web services, virtual machines, middleware, MetaData Services (MDS) modules, Policy Decision Points (PDPs), Policy Information Points (PIPs), Policy Administration Points (PAPs), Policy Enforcement Points (PEPs), identity service providers, the Internet, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment employing a server-side policy enforcement system 18 and accompanying dynamic runtime message modification module 24 to selectively inject code in application response messages (also simply called responses herein) for execution on a client device 10 to thereby enhance computing environment security and resource management.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

The example system 12 includes one or more client devices or systems 12 (e.g., mobile phone, tablet, desktop computer, etc.) in communication with a server system 14 or cloud via a network, such as the Internet. The client system 12 runs a client-side program 16, such as a browser, mobile app, or other software application that is configured to send request messages (also simply called requests herein) to a protected resource 20, 22 of the server system 14.

For the purposes of the present discussion, a Service Oriented Architecture (SOA) server may be any server that is adapted to facilitate providing services or subprocesses accessible to one or more client computers coupled to a network. More generally, a server may be any computing resource, such as a computer and/or software that is adapted to provide content, e.g., data and/or functionality, to another computing resource or entity that requests it, i.e., the client (e.g., corresponding to the client system(s) 12). A server system may be any collection of one or more servers. A client may be any computer or system that is adapted to receive content from another computer or system, i.e., a server and/or accompanying application running thereon or therein. A client system may be any collection of one or more clients.

A protected resource (e.g., the application 20, backend database 22, etc.) may represent software functionality and/or data (i.e., computing resources) of (or maintained or fronted by) an application 20 that requires authentication of entities seeking to use the software functionality and/or data. The protected resource may include, for instance, a web service and/or an Application Programming Interface (API) that may provide access to data and functionality (e.g., cloud-based data maintained via a backend database 22) to the client system 12, provided that the user of the client system 12 and associated client-side program 16 are properly authenticated and authorized to use the computing resources 20, 22. For the purposes of the present discussion, cloud-based data may be any data that is maintained via one or more servers.

In the present example embodiment, the policy enforcement system 18 implements functionality for authenticating and authorizing the client-side program 16, such as by retrieving user login credentials, and determining which data and/or functionality that the client-side program 16 is permitted to use, e.g., in accordance with one or more permissions associated with the login credentials.

Note that the server system 14 may include various types of servers, such as session servers, authentication servers, Policy Decision Point (PDP) servers, web servers, application servers, and so on. For example, the policy enforcement system 18 may run on a session server and may include a Policy Enforcement Point (PEP) used to selectively intercept messages and perform authentication, authorization, and session management functions. In certain implementations, the PEP may convert intercepted request messages into eXtensible Access Control Markup Language (XACML) authorization requests, which may be forwarded to a Policy Decision Point (PDP) for further processing. The PDP may then evaluate the authorization request in view of predetermined computing-environment policies, which may be retrieved from a Policy Retrieval Point (PRP). Any message or session attributes can also be retrieved from a Policy Information Point (PIP). The PDP may use information about the policies and related attributes to decide whether or not to authorize a particular request message.

Generally, for the purposes of the present discussion, a policy enforcement system may be any interface between a software application and another computing resource, where the interface implements software functionality for controlling or affecting communications between the application and computing resource in accordance with a policy or set of rules or configuration parameters. The policy can include, for example, session control functionality, authentication and identity verification, authorization (e.g., in accordance with permissions assigned to the login credentials, etc.), and so on.

A computing session may be any instance of a dialog or information exchange between computing devices or software applications, wherein one or more of the computing devices or software applications have provided authentication credentials or login information (e.g., username and password) of a user of one or more of the computing devices to initiate the computing session. The terms "computing session" and "session" may be employed interchangeably herein.

In the present example embodiment, a requesting module 26 of the client-side program 16 issues a request message to the application 20. The request message is then intercepted by the policy enforcement system 18, which ensures that the client-side program 16 is properly authenticated and authorized to communicate with the application 20. After authentication and authorization, the policy enforcement system 18 then forwards the request message to the application 20 for further processing and subsequent issuance of an associated response message.

The policy enforcement system 18 also intercepts the application response message. The application response message is then processed by the dynamic runtime message modification module 24 (and accompanying modules, as discussed more fully below), along with context information associated with the response message to determine if a condition (as specified by predetermined configuration rules) for injecting particular code into the response message is met.

Conditions for injecting code in response messages may be preconfigured, e.g., via adjustable configuration rules maintained by the policy enforcement system 18. For example, in one embodiment, the configuration rules may specify that users of a particular role (e.g., administrator, manager, etc.) or messages addressed to a particular Uniform Resource Locator (URL), shall result in injection of code in a response message delivered to the client-side program 16. In certain specific implementations, the code may be implemented via JavaScript that is injected (by the dynamic runtime message modification module 24) into a HyperText Transfer Protocol (HTTP) response message, which is then automatically run by a client-side policy code execution module 18 upon receipt of the selectively modified response message. Any requested data (e.g., as requested via a request message) may be further processed by a requesting module 26 of the client-side program 16.

The injected code may specify, for example, use of an event listener 30 to detect a close event, such as a browser-close event (when the client-side program 16 is a browser). A close event may be any halting of the running of the client-side program 16. Upon detection of the close event, the client-side policy code execution module 28 then issues an asynchronous call to the policy enforcement system 18 and/or accompanying session-control functionality (via a Uniform Resource Locator (URL) used to implement session logout functionality of the server system 14), where the call specifies to logout of, i.e., terminate the current session. In the present example embodiment, the policy enforcement system 18 also acts as a logout callback endpoint. The policy enforcement system 18 may run on a web server.

By selectively logging out and terminating communication sessions (also called computing sessions herein) when a software program, such as a browser, is closed, this may help to mitigate the accumulation of stale communications sessions (and accompanying unnecessary computing resource usage) by the server system 14. Furthermore, any security issues involving the stale sessions can be mitigated by closing the stale sessions.

Note however, that embodiments are not limited to implementations involving injecting code into response messages for automatic execution on the client-side program 16, such as a browser, mobile app, etc. For example, code may also be injected into request messages, e.g., so as to enhance session security, data logging functionality, and so on, as discussed more fully below. This may involve injection of code for implementing a Time-based One Time Password (TOTP) for securing a Single Sign On (SSO) cookie and/or token used by the client-side program 16 to access protected resources (e.g., the application and backend database 22 and accompanying data) of the server system 14 in accordance with permissions associated with and authorized via the login credentials used to log into the server system 14 via the policy enforcement system 18.

Accordingly, while the policy enforcement system 18 is discussed herein as implementing functionality for selectively injecting code in response messages from the application 20, alternatively, or in addition, the policy enforcement system 18 may be adapted to intercept request messages (not just response messages) and to selectively inject code in the request messages for subsequent server-side execution.

Note that the dynamic runtime message modification module 24 can effectively enhance the flexibility, adaptability, security, resource management, and so on, of the overall system 10 and accompanying network. For example, this may be achieved, in part, by selectively distributing code for client-side and/or server-side execution, e.g., so as to effectuate network policies and priorities. The distributed code (e.g., distributed via injection of the code into messages) can also be accompanied by data from the policy enforcement system 18, which can facilitate distributing context information pertaining to policies that should be enforced or facilitated via the injected code.

Similarly, the code that is injected in messages for remote execution (i.e., remotely relative to the policy enforcement system 18) may also send client and/or application context information back to the policy enforcement system 18. In the example discussed above, this client context information can include information indicating that a particular browser has been closed.

Figure 2:
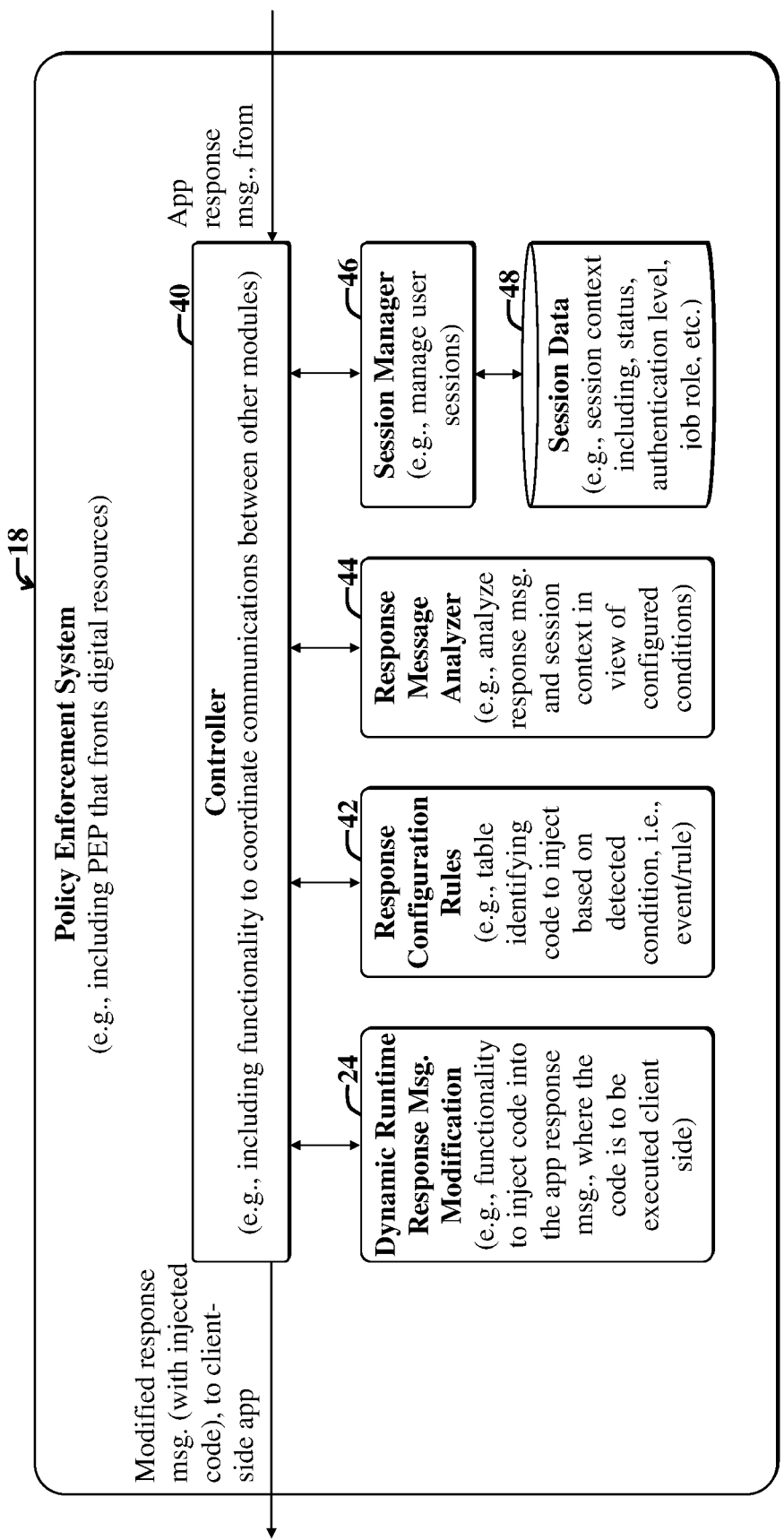
FIG. 2 illustrates additional example detail of the policy enforcement system of FIG. 1 when used for selective runtime response message modification.

FIG. 2 illustrates additional example detail of the policy enforcement system 18 of FIG. 1 when used for selective runtime response message modification. The example policy enforcement system 18 includes a controller module 40 in communication with a dynamic runtime response message modification module 24, configuration rules 42 (and associated functionality for facilitating authorized adjustments to the rules), a response message analyzer 40, a session manager 46, and associated session data 48 (also called session context information herein).

Figure 3:
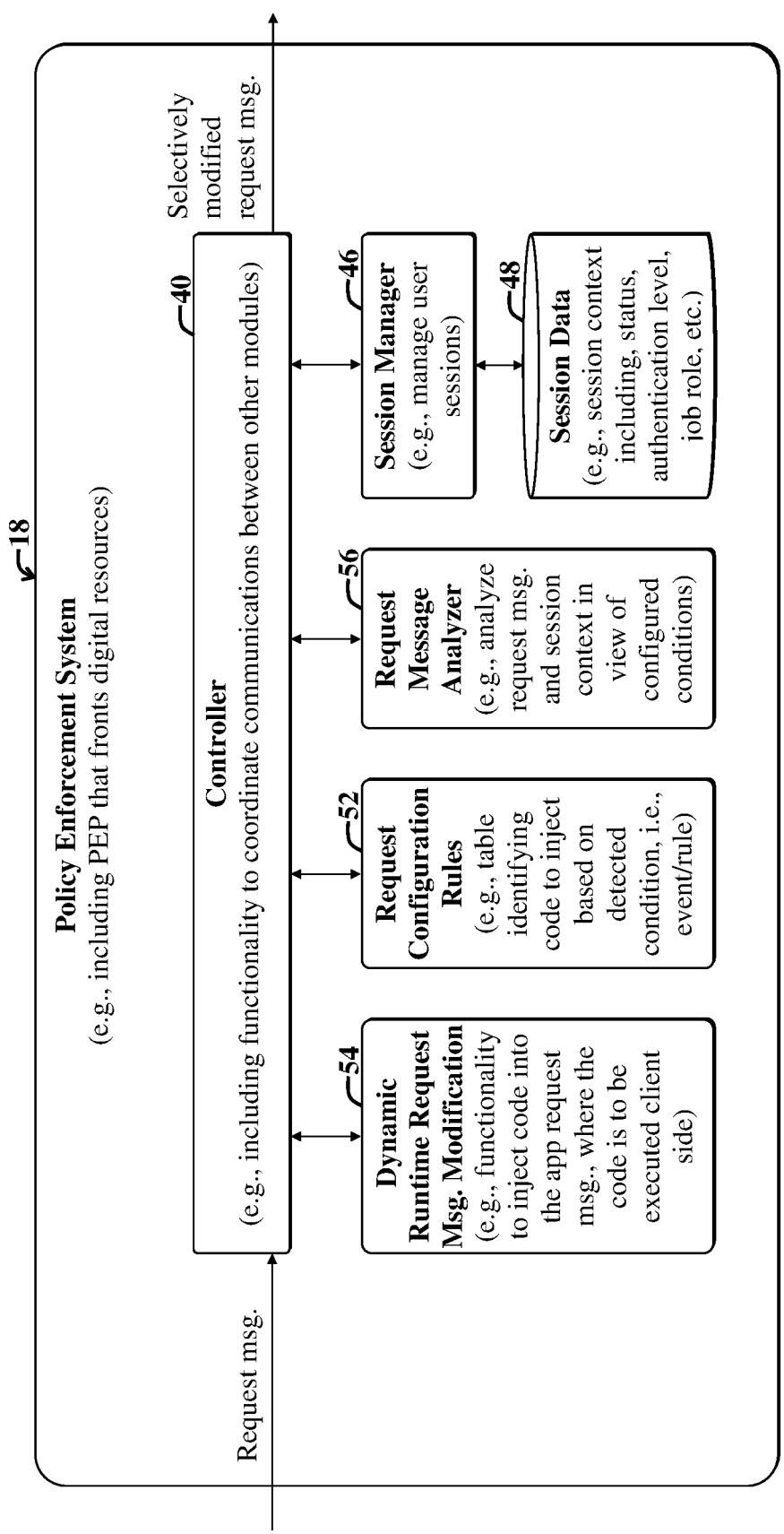
FIG. 3 illustrates additional example detail of the policy enforcement system of FIG. 1 when used for selective runtime request message modification.

With reference to FIGS. 1 and 3, in the present example embodiment, the controller 40 includes code, e.g., middleware, etc., for facilitating coordinating communications between the other modules 24-48 of the policy enforcement system 18. The controller 40 also includes code for facilitating intercepting application response messages, i.e., response messages from the application 20 of FIG. 1, and enabling selective modification of the response messages in accordance with the configuration rules 42, as discussed more fully below.

In the present example embodiment, the response message analyzer 44 analyzes incoming response messages (which can include one or more HTTP response messages from the application 20 of FIG. 1, which may run on an application server, such as a REpresentational State Transfer (REST) server) in view of the configuration rules 42 and context information, such as information in the message itself and/or session context 48 that is obtainable by the response message analyzer 44 via the session manager 46 and controller 40. If an incoming response message and the associated context information meet one or more conditions set forth by the configuration rules 42, then the intercepted message is passed to the dynamic runtime response message modification module 24. The dynamic runtime response message modification module 24 includes functionality for injecting code into the response message, where the code to inject is specified by the configuration rules 42.

The configuration rules 42 may include a table that indicates context information pertaining to an event or rule and corresponding code to inject. An example partial table illustrating example configuration rules 42 is shown below in Table 1.

TABLE 1

| Event/Rule | Code | Code type |
| --- | --- | --- |
| URL contains/hr/* | <JS Code goes here> | Java Script |
| Group = Admin | <JS Code goes here> | JavaScript |

In the example of Table 1, the event/rule represents a condition or rule, such that if the condition is met, then the code (e.g., JavaScript) associated with that condition is injected into the response message by the dynamic runtime response message modification module 24. Examples of context information that may be used for determining what code to inject include: information indicating that the Uniform Resource Locator (URL) of the response message contains particular characters or strings (e.g., "/hr"), and the user role or user role of the logged in user (participating in the communication session between the client-side program 16 of FIG. 1 and the protected resource, i.e., the application 20 of FIG. 1) meets the indicated condition (e.g., that the user role is an administrator role). The user role information (e.g., that the user is an administrator) for a particular communications session may represent a type of session data 48, i.e., session context, which is obtainable by the response message analyzer 44 via the session manager 46.

If the intercepted message does not meet any conditions set forth by the configuration rules 42, as analyzed via the response message analyzer 44, then the message may be passed on to the client-side program 16 of FIG. 1 without code injection or modification. If one or more of the configuration rules or conditions are met (e.g., as exemplified in the first column of Table 1 above), then associated predetermined code is injected into the response message by the dynamic runtime response message modification module 24 before the message is passed on the client-side program 16 of FIG. 1 for automatic client-side execution of the injected code.

Note that in certain specific embodiments, the response messages are HTTP response messages, which are injected with scripts (e.g., JavaScripts) to be automatically run on client-side programs, such as browsers. Note that those skilled in the art with access to the present teachings may readily implement software functionality for injecting code in messages for running automatically as extensions or plugins via client-side programs 16 (such as browsers, mobile apps, etc.) as discussed herein, without undue experimentation.

In a specific embodiment, the injected code may include a script for detecting closure of the client-side program 16 of FIG. 1, and then issuing a logout signal to a logout callback endpoint, such as represented by the session manager 46 of the policy enforcement system 18. In another embodiment, the injected code includes a script for encrypting Single Sign On (SSO) cookies or tokens (e.g., via use of a Time-based One-Time Password (TOTP)) used by the client-side program 16 to communicate with the application 20 of FIG. 1 during a secure computing session. Use of selective code injection discussed herein may obviate the need for tedious installation of specialized plugins to enhance security as discussed herein.

Furthermore, note that code-injection implemented by various embodiments discussed herein may be automatically change in accordance with changing context information (e.g., message and/or session context) in the computing environment, and the code may be injected and run during runtime of the client-side program 16 and the application 20 of FIG. 1. Accordingly, the policy enforcement system 18 implements functionality for enabling dynamic runtime modification of response messages. Note however, that embodiments are not limited to runtime modification of response messages via code injection, but can also include dynamic runtime modification of request messages and injection of code and/or data into messages for subsequent automatic execution.

FIG. 3 illustrates additional example detail of the policy enforcement system 18 of FIG. 1 when used for selective runtime request message modification. Note that the modules 24, 40-48 of FIG. 2 are used for selective response message modifications (i.e., code and/or data injections), whereas modules 40, 46-56 of FIG. 3 are instead used for selective request message modifications. Furthermore, note that the embodiments of FIGS. 2 and 3 may be used separately, and or in combination in an implementation of the policy enforcement system 18 of FIGS. 1-3. When used together, the policy enforcement system 18 as shown in FIG. 1 may be used to intercept code in both response messages and request messages that meet predetermined criteria, conditions, or rules, as set forth via the configuration rules 42 and 52 of FIGS. 2 and 3, respectively.

In the present example embodiment, the controller 40 includes functionality coordinating communications between the modules 40, 46-56 of FIG. 3 and for selectively intercepting request messages send from the client-side program 16 of FIG. 1 that are addressed to the protected resource, e.g., the application 20 (which is "protected by" and/or "fronted by" the policy enforcement system 18 of FIG. 1).

The request message is then analyzed by the request message analyzer 56 in view of the configuration rules 52 and context information, such as information available in the request message itself and/or any session data 48 applicable to any communications session established between the client-side program 16 and application 20 of FIG. 1. Code (and/or data) is then selectively injected into the request message for server-side execution, e.g., as a plugin or extension of the application 20 of FIG. 1.

Examples of code that may be injected into a request message include code for logging particular events or software actions (e.g., use of GET, POST, etc. messages) involving use of the application 20 during a given session. The logged data may augment session data 48 maintained by the session manager 46. This may be used, for instance, to enhance security or to trigger flags when a particular client-side program (e.g., the client-side program 16 of FIG. 1) exhibits suspicious activity. Those skilled in the art will appreciate that the exact conditions (as set forth via the configuration rules 52) and code to inject into an intercepted request and/or response message are implementation specific and may vary depending upon the needs of a given implementation.

Figure 4:
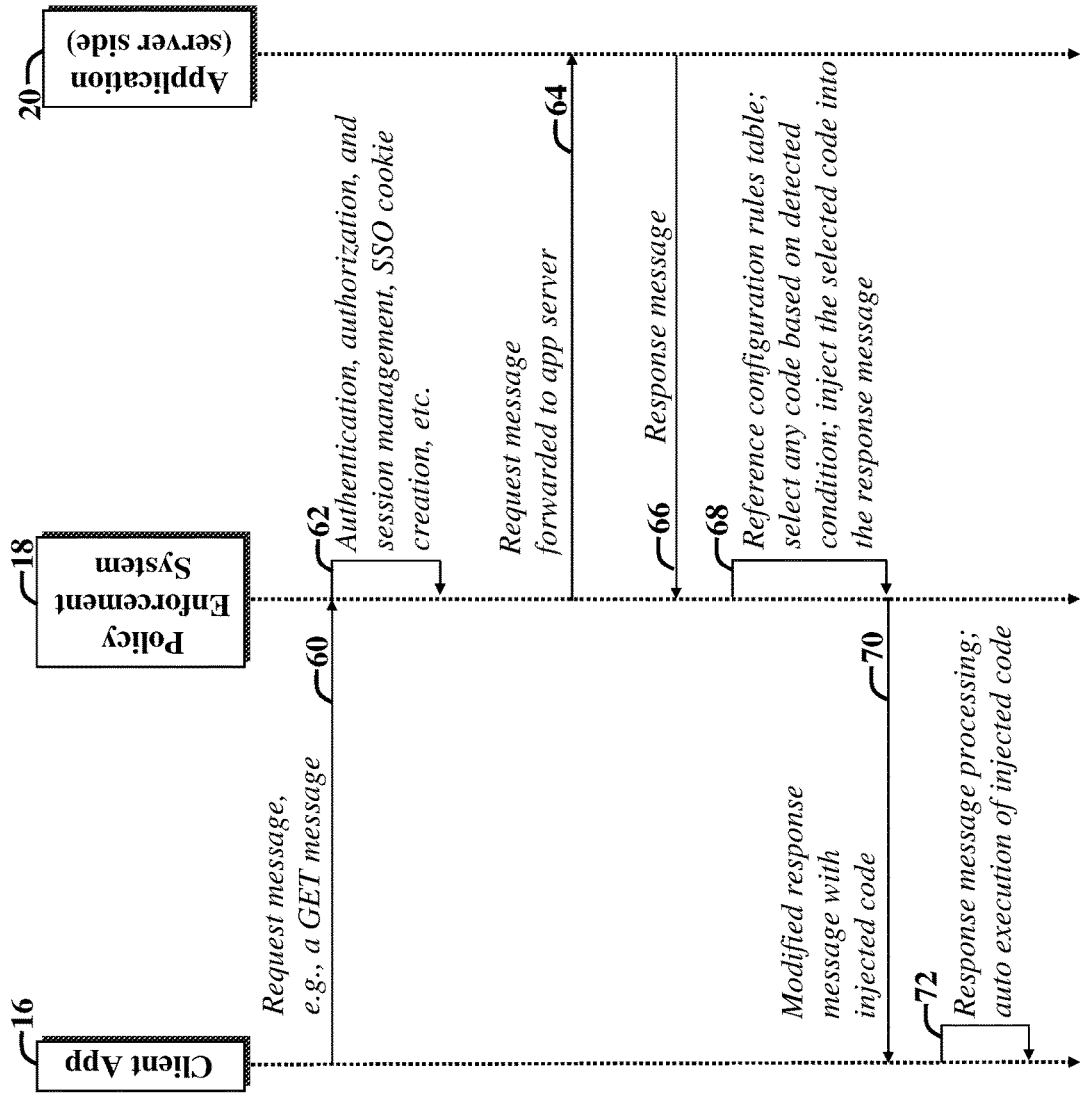
FIG. 4 is a first sequence diagram illustrating example messages exchanged between the client application, policy enforcement system, and application of FIG. 1 during dynamic runtime response message modification.

FIG. 4 is a first sequence diagram illustrating example messages 60-72 exchanged between the client application 16, policy enforcement system 18, and application 20 of FIG. 1 during dynamic runtime response message modification.

In the present example embodiment, the client application 16 sends an initial request message 60 to the policy enforcement system 18. The policy enforcement system 18 then implements an authentication and authorization procedure 62 (which may vary depending upon the requirements of a particular computing environment, application, etc.) to authenticate the client application 16 and accompanying user (e.g., via checking user login credentials, etc.); to authorize the client application 16 (and accompanying user) for use of the application 20 and associated computing resources; and to issue any tokens (e.g., via Single Sign On (SSO) cookies) used for secure communications between the client application 16 and the server-side application 20 during a particular communications session.

The authorization may involve accessing permissions associated with the user login credentials, and helping to ensure that the client application 16 is only permitted to use resources of the application 20 that it is permitted to use and in the manner that it is permitted to use therm. For example, an administrator may have additional privileges beyond another user.

Subsequently, the request message is forwarded to the server-side application 20 (as indicated by a forwarded request message 64), which may run on an application server or other type of server. The request message 60, 64 may be, for example, a REpresentational State Transfer (REST) GET, POST, PUT, PATCH, DELETE, or other type of request message.

The application 20 then processes the request message 64 and returns a response message 66. The response message 66 may include data (e.g., representing a computing object, webpage, etc.) responsive to a GET message, etc.

The policy enforcement system 18 then intercepts the response message 68 and then performs any message modification analysis and procedures 68. To implement the modification procedures 68, the policy enforcement system 18 analyzes the response message 66 and/or any applicable session context to determine if the response message 66 (and associated context information) meets one or more predetermined conditions or rules for the insertion of code and/or data therein.

If during message modification analysis and procedures 68, the response message 66 and/or session context meet a configuration condition or rule for the injection of code in the response message 66, then the predetermined code is injected into the response message, resulting in a modified response message 70. The modified response message 70 is then delivered to the client application 16, which may automatically execute the code as an extension or plugin during response message processing 72. In one embodiment, the client application 16 is or includes a browser, and the injected code is implemented via JavaScript. Note that many modern browsers may come preconfigured with the ability to process JavaScripts.

The indication to the browser (e.g., where the browser may represent the client application 16) to execute the injected code may be supplied in a message header, e.g., a HyperText Markup Language (HTML) header. In certain embodiments, the modified response message 70 will include data for a webpage, where, when the browser 16 processes the message 70 to render the associated webpage, it parses the message into a Document Object Model (DOM), whereby an interface engine or framework (e.g., an AJAX (Asynchronous JavaScript and eXtensible markup language) engine using JavaScript Object Notation (JSON) computing objects) can then process the resulting DOM to execute any extensions provided via code that has been injected into the modified response message 70.

Note that conventionally, AJAX methods and associated engines can dynamically update or modify webpages via JavaScript, without requiring retrieval of a new page from the server system 14 of FIG. 1. However, implementations of certain embodiments discussed herein may leverage browser extensibility afforded by such methods to execute client-side JavaScript for implementing other tasks, such as mitigating stale communications sessions (e.g., as may occur when users do not logout of a particular session, and instead just close the browser or other client application 16), as discussed more fully below.

Figure 5:
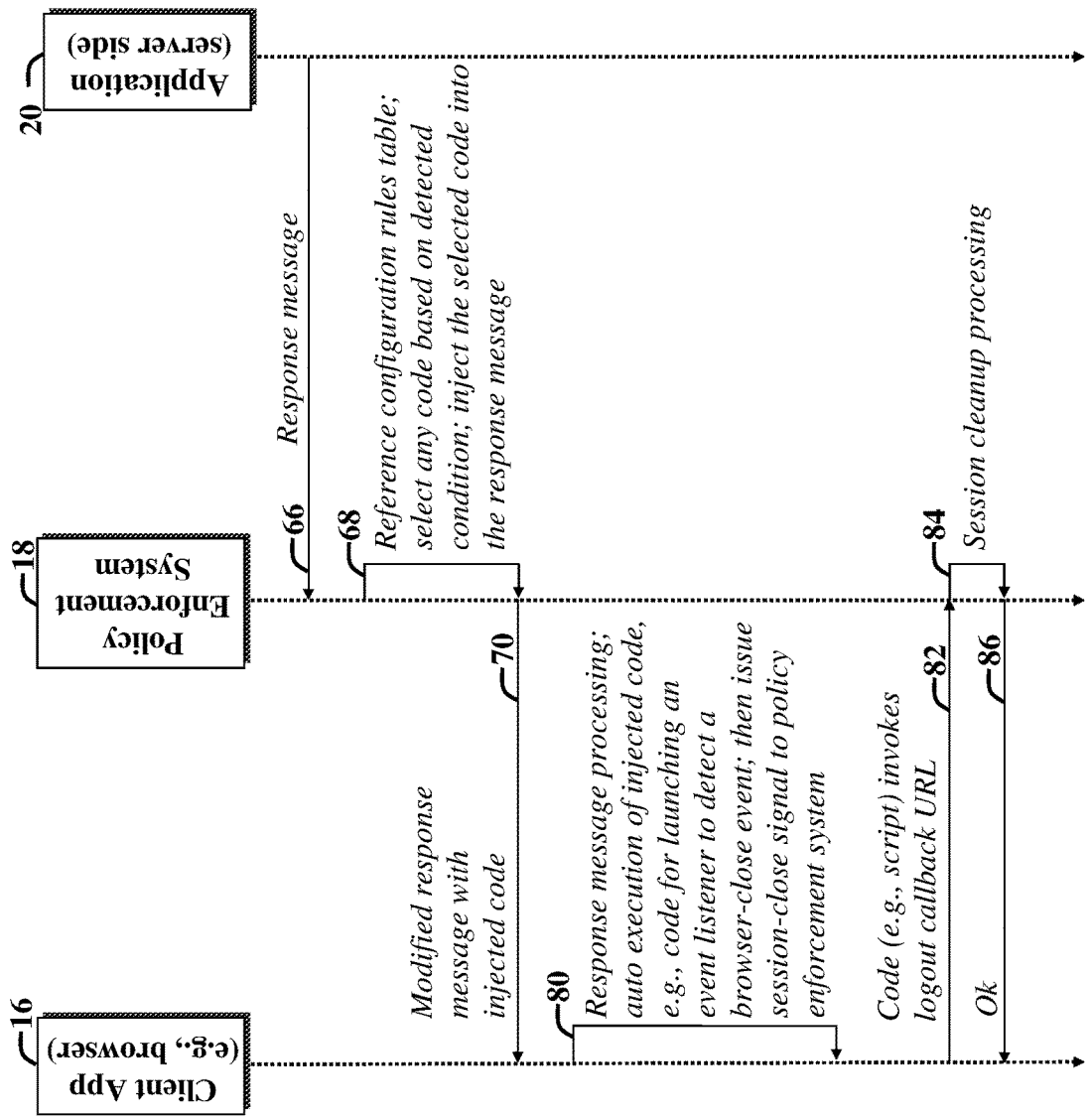
FIG. 5 is a second sequence diagram illustrating example messages exchanged between the client application, policy enforcement system, and application of FIG. 1 during implementation of stale-browser session clean up via code injected into a response message.

FIG. 5 is a second sequence diagram illustrating example messages 66-70, 80-86 exchanged between the client application 16, policy enforcement system 18, and application 20 of FIG. 1 during implementation of stale-browser session clean up via code injected into a response message 70.

The sequence flow of FIG. 5 continues the flow of FIG. 4 after the client application 16 receives the modified response message 70 with injected code. The client application 16 then performs response-message processing 80. In the present example embodiment, the injected code is automatically executed, and includes instructions for launching an event listener (e.g., corresponding to the event listener 30 of FIG. 1) to detect a close event, e.g., the closing of the client application 16 without logging out of a communication session. The code, e.g., script, implements further instructions to issue an asynchronous signal 92 to the policy enforcement system 18 and accompanying session manager 46 of FIG. 2 to close the current session. The policy enforcement system 18 then closes the session during session cleanup processing 84, thereby preventing the formation of a stale session. An optional confirmation 96 (that the session was closed) may be sent back to the client application 16 during the client-application closing procedure.

Note that conventionally, communication sessions (also called computing sessions herein) may have a timeout, such that the session automatically closes after a predetermined amount of time passes without the session being used or message exchange. However, with very large systems or platforms (e.g., banking websites, enterprise collaboration platforms, and so on) excessive amounts of stale sessions may still accumulate, despite short time out intervals, thereby resulting in accumulation of stale computing sessions and accompanying excess use of computing resources, which may also result in additional security risks. To mitigate this, conventionally, the session timeout interval is reduced. However, excessively short timeout intervals can negatively impact user productivity and use of the protected computing resources being accessed, thereby necessitating that the user must repeatedly log back into the platform (after being timed out) during the course of normal work.

The present example embodiment can efficiently mitigate such problems associated with the accumulation of stale browser sessions, and it can do so without requiring the user to install specialized plugins, etc. Furthermore, the code injection and subsequent code execution can occur automatically and dynamically (e.g., in response to changing context of the computing environment) during runtime of the overall system (e.g., the system 10 of FIG. 1), including during runtime of the client application 16, policy enforcement system 18, and application 20 (i.e., the protected resource being accessed by the client application 16).

Figure 6:
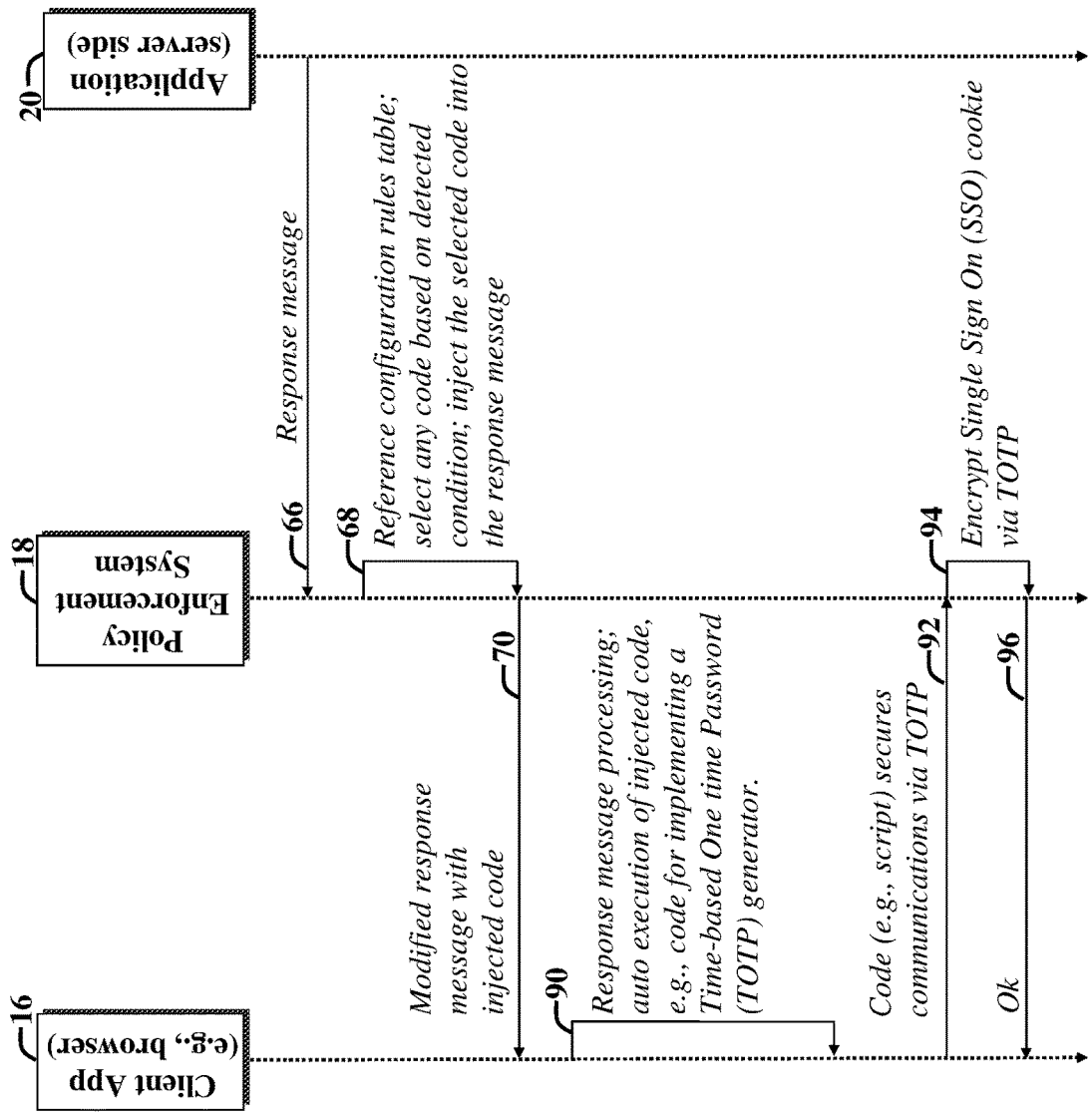
FIG. 6 is a second sequence diagram illustrating example messages exchanged between the client application, policy enforcement system, and application of FIG. 1 during implementation of an injected script for securing Single Sign On (SSO) cookies and associated communications between the client application and policy enforcement system.

FIG. 6 is a second sequence diagram illustrating example messages exchanged between the client application 16, policy enforcement system 18, and application 20 of FIG. 1 during implementation of an injected script for securing Single Sign On (SSO) cookies and associated communications between the client application and policy enforcement system 18 of FIG. 1.

The sequence flow of FIG. 6 is similar to the sequence flow of FIG. 5 with the exception that steps or messages 80-86 of FIG. 5 are replaced with steps or messages 90-96 in FIG. 6. In the present example embodiment of FIG. 6, instead of (or in addition to) the client application 16 executing injected code for closing a communications session in response to detection of browser-close event (or other close event), the code executes a procedure 90 for encrypting a session cookie or token used for Single Sign On (SSO) authenticated communications between the client application 16 and protected server-side application 20. This helps to prevent unauthorized hijacking of the SSO session cookie during a particular computing session.

In the present example embodiment, the injected code creates a Time-based One time Password (TOTP) and shares it with the policy enforcement system 18 to facilitate encrypted exchange 92 of the SSO session cookie. The policy enforcement system 18 may then use the TOTP (e.g., at step 94) for further session communications with the authenticated client application 16. The policy enforcement system 18 may issue an acknowledgement 96 that the TOTP is being used to encrypt the applicable SSO session cookie.

Figure 7:
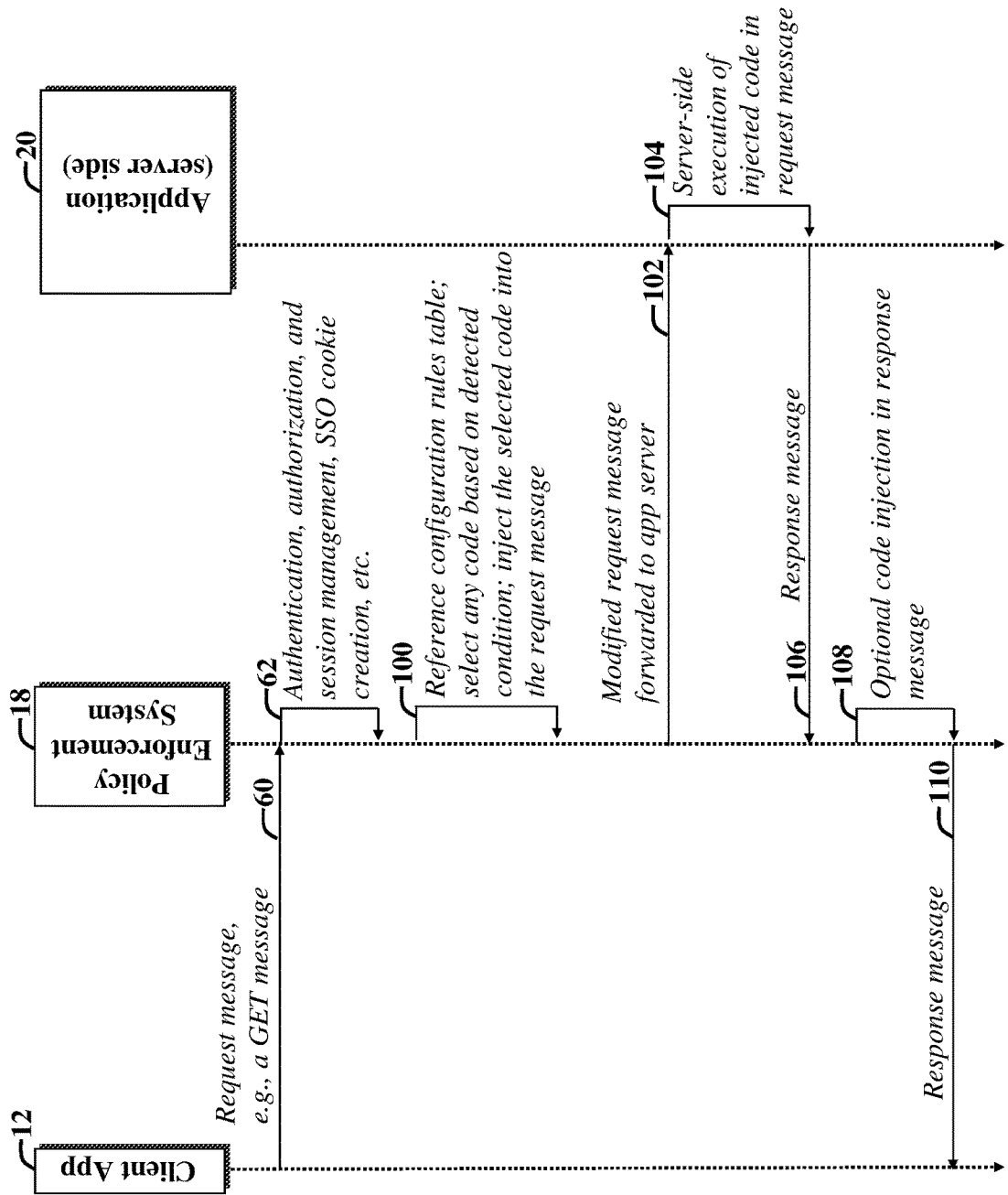
FIG. 7 is a third sequence diagram illustrating example messages exchanged between the client application, policy enforcement system, and application of FIG. 1 during selective request message modification, e.g., code-injection to facilitate server-side data logging operations, etc.

FIG. 7 is a third sequence diagram illustrating example messages exchanged 60, 62, 100-110 between the client application 16, policy enforcement system 18, and application 20 of FIG. 1 during selective request message modification, e.g., code-injection to facilitate server-side data logging operations, and so on.

After the client application 16 issues a request message 60, and the policy enforcement system 18 performs authentication, authorization, and session management functions 62. The policy enforcement system 18 references request-message configuration rules (e.g., the configuration rules 52 of FIG. 3) 100. The configuration rules may contain a table (e.g., exemplified by Table 1 above) with code entries for different detected conditions or rules (e.g., corresponding to the first column of Table 1 above). The conditions may be based on computing environment context information, e.g., information in the request message 60 and/or information characterizing a particular communication session established between the client application 16 and protected resource 20 being accessed thereby.

If one or more of the conditions (as set forth via the configuration rules 52 of FIG. 3) are met, the code is injected into the request message, resulting in a modified request message 102. The modified request message 102 is then sent to the server-side application 20 for server-side execution as an extension or plugin to the server-side resource, i.e., application 20.

In the present example embodiment, the injected code implements functionality for logging additional session context information with the policy enforcement system 18. This session context information may include, for instance, data about particular software actions that the application 20 has been asked to perform by the client application 16 via the request message 60. This additional session context information (as may be stored among the session data 48 of FIG. 3) is then used by the policy enforcement system 18 to facilitate enforcement of system polices, rules, or other objectives.

Figure 8:
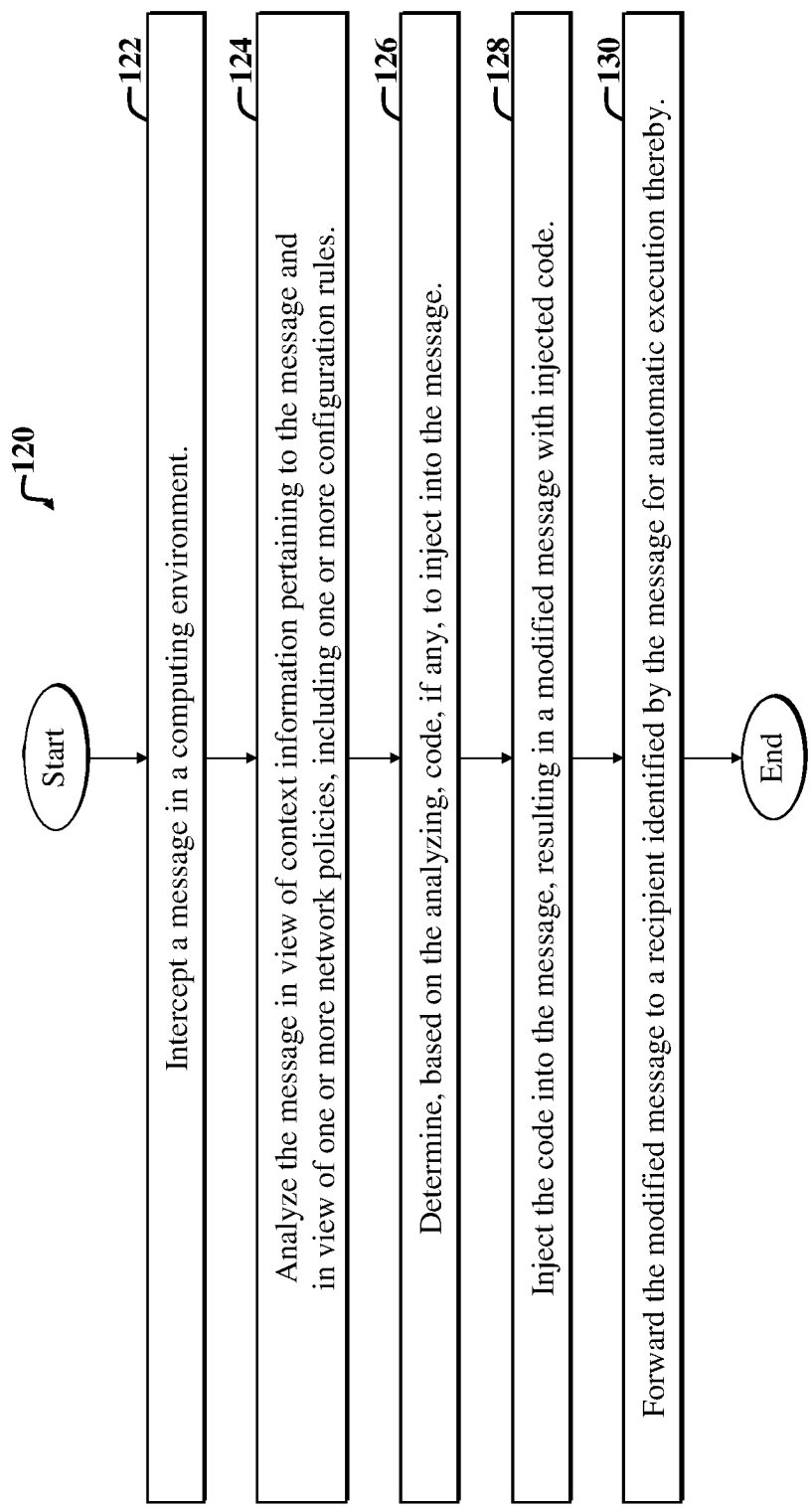
FIG. 8 is flow diagram of a first example method that is suitable for use with the embodiments of FIGS. 1-7.

FIG. 8 is flow diagram of a first example method 120 that is suitable for use with the embodiments of FIGS. 1-7. The first example method 120 is adapted to selectively inject code into messages, thereby implementing dynamic runtime adjustment of computing code running in a computing environment.

The first example method 120 includes a first message-intercepting step 122, which involves intercepting a message (e.g., the message 66 of FIG. 4) in a networked computing environment (e.g., corresponding to the computing environment or system 10 of FIG. 1), resulting in an intercepted message.

Next, a message-analyzing step 124 includes analyzing the intercepted message (e.g., via the response message analyzer 44 FIG. 2 and/or request message analyzer 56 of FIG. 3) in view of context information (e.g., corresponding to session data 48 of FIGS. 2 and 3) pertaining to the message and in view of one or more network policies, including one or more configuration rules (e.g., corresponding to the response configuration rules 42 of FIG. 2 or the request configuration rules 52 of FIG. 3). The context information may include session data pertaining to a computing session associated with the intercepted message; information contained in or otherwise pertaining to the message, and so on.

Subsequently, an injection-determining step 126 involves determining, based on the analyzing, code to inject into the message. This may be performed, for instance, by the response message analyzer 44 of FIG. 2 or the request message analyzer 56 of FIG. 3.

Next, a code-injecting step 128 includes injecting the code into the message, resulting in a modified message with injected code response thereto. This may be performed, for instance, by the dynamic runtime response message modification module 24 of FIG. 2 or the dynamic runtime request message modification module 54 of FIG. 3.

Subsequently, a message-forwarding step 130 includes forwarding the modified message to a recipient, such as a client-side program (e.g., the client-side program 16 of FIG. 1) identified by the message, i.e., addressed by the modified message.

Note that the first example method 120 may be modified, without departing from the scope of the present teachings. For example, steps may be reordered; other steps may be added; some steps may be removed; and additional detail may be added to different steps.

For instance, the first example method 120 may be adjusted to further specify that the intercepted message includes or represents a response message that is responsive to a client request message sent from a client-side application (e.g., the client-side program 16 of FIG. 1) and addressed to a server-side application (e.g., the application 20 of FIG. 1), which may represent a protected resource (e.g., protected by the policy enforcement system 18 of FIG. 1).

The injected code may include instructions to be automatically executed via the client-side application (e.g., the client-side program 16 of FIG. 1). The client-side application may include a browser, mobile application, etc. The injected code may be implemented in JavaScript. In a specific implementation, the code includes a script for detecting a browser-close event; and issuing a session-close signal to a session management system or policy enforcement system running server-side in response to the detection of the browser-close event.

The message-intercepting step 122 may further include using a policy enforcement system (e.g., the policy enforcement system 18 of FIG. 1) to intercept the message, which may include or represent a response message. The context information may include computing session metadata, i.e., data describing the computing session in which the response message is a part.

The computing session metadata may include, for instance, information pertaining to a user role associated with the sender of a request message to which the response message responds to. The user role may include an administrator role or other role, such as job position, title, etc., which may be associated with different privileges.

The policy enforcement system may include or be implemented, at least in part, by a Policy Enforcement Point (PEP) with access to a set of configuration rules (e.g., the configuration rules 42 and 52 of FIGS. 2 and 3, respectively). The configuration rules may include one or more associations identifying code to inject into the response message when a condition is met (e.g., as exemplified in Table 1 above).

The first example method 120 may further include determining when the condition is met by referring to the configuration rules in combination with the context information.

The first example method 120 may further include employing the injected code to facilitate automatic closure of a session established between a sender of the message (e.g., the client-side program 16 of FIG. 1) and a recipient of the message (e.g., the application 20 of FIG. 1) in response to the detection of a close event pertaining to software (e.g., the client-side program 16 of FIG. 1) of the recipient, whereby a stale session is terminated before consuming excess computing environment resources or degrading security thereof.

Alternatively, or in addition, the injected code may include instructions for enabling employing the injected code to facilitate automatic encoding of session information (via use of a Time-based One Time Password (TOTP)) pertaining to a computing session between the recipient and a sender of the response message, such that the automatic encoding is implemented via use of the the TOTP.

Figure 9:
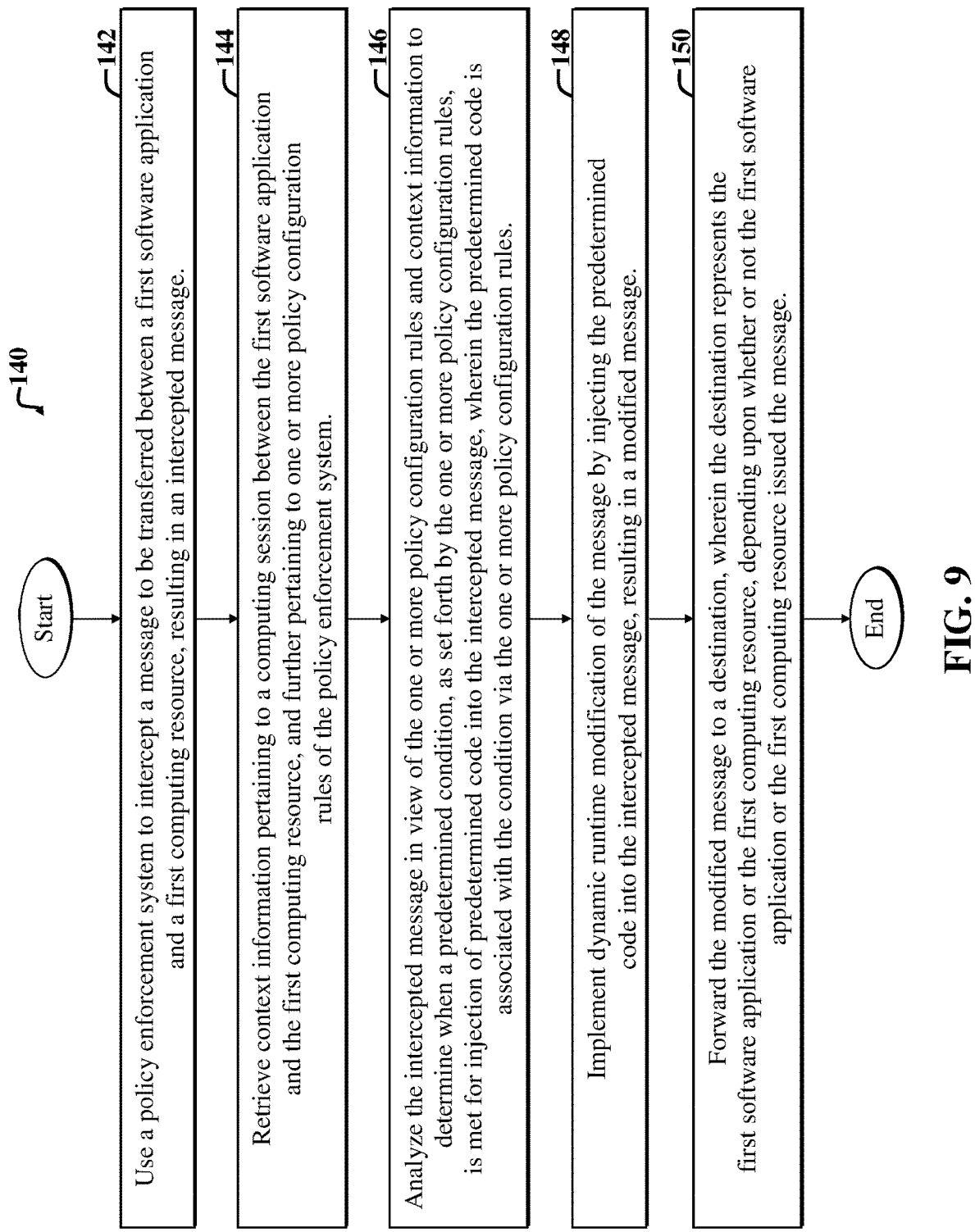
FIG. 9 is flow diagram of a second example method that is suitable for use with the embodiments of FIGS. 1-8.

FIG. 9 is flow diagram of a second example method 140 that is suitable for use with the embodiments of FIGS. 1-8. The second example method 140 facilitates enhancing security in a networked computing environment, such as the computing environment or system 10 of FIG. 1.

The second example method 140 includes an initial intercepting step 142, which includes using a policy enforcement system (e.g., the policy enforcement system 18 of FIG. 1) to intercept a message to be transferred between a first software application (e.g., the client-side program 16 of FIG. 1) and a first computing resource (e.g., the application 20 of FIG. 1), resulting in an intercepted message.

Next, an information-retrieving step 144 includes retrieving context information (e.g., session and/or message metadata) pertaining to a computing session between the first software application and the first computing resource, and further pertaining to one or more policy configuration rules of the policy enforcement system.

Subsequently, an analyzing step 146 includes analyzing the intercepted message in view of policy configuration rules (e.g., the response configuration rules 42 of FIG. 2) and context information (e.g., which may include session data 48 of FIG. 2) to determine when a predetermined condition, as set forth by the one or more policy configuration rules (e.g., as exemplified in Table 1 above), is met for injection of predetermined code into the intercepted message. The predetermined code is associated with the condition via the one or more policy configuration rules.

Next, an implementing step 148 includes implementing dynamic runtime modification of the message by injecting the predetermined code therein, resulting in a modified message (e.g., the modified response message 70 of FIG. 4).

Subsequently, a forwarding step 150 includes forwarding the modified message to the destination, wherein the destination represents the first software application (e.g., the client-side program 16 of FIG. 1) or the first computing resource (e.g., the server-side application 20 of FIG. 1), depending upon whether or not the first software application or the first computing resource issued the message.

Note that the method 140 may be modified, without departing from the scope of the present teachings. For example, the method 140 may be modified to specify that the software application includes a client-side software application, such as a browser.

The computing resource may include or represent a web service or Application Programming Interface (API) (e.g., corresponding to the server-side application 20 of FIG. 1). The computing resource may further include cloud-based data and an associated database application (e.g., corresponding to the backend database 22 of FIG. 1).

The second example method 140 may further specify that the message includes a response message from the computing resource (e.g., including the server-side application 20 of FIG. 1), wherein the response message from the computing resource is directed to the client-side software application.

The client-side software application may include a browser, and the predetermined code may be written in JavaScript. The browser may be adapted to automatically execute the predetermined code received via a modified response message that has been injected with the predetermined code (e.g., by the policy enforcement system 10 of FIG. 1).

The predetermined code may include code for determining when a browser-close event occurs, and then issuing a signal to the policy enforcement system to close the current computing session in response to determining that the message and/or associated computing session context information meets a predetermined condition as set forth by one or more configuration rules.

The second example method 140 may further (or alternatively) specify that the software application includes a server-side software application, and the computing resource includes a client-side software application. The intercepted message may include a request message sent from the client-side software application and addressed to the server-side software application, and/or alternatively, a response message sent from the server-side software application (e.g., the server-side application 20 of FIG. 1) to the client-side software application (e.g., the client-side program 16 of FIG. 1).

The predetermined code may include code for instructing the policy enforcement system (e.g., the policy enforcement system 18 of FIG. 1) to implement a logging operation to log data derived from the client-side software application. The policy enforcement system may further include session-control functionality, wherein the session-control functionality (e.g., corresponding to the session manager 46 of FIGS. 2 and 3) includes code for facilitating authentication, authorization, and session management pertaining to a session established, or to be established between the client-side software application and the server-side software application.

Figure 10:
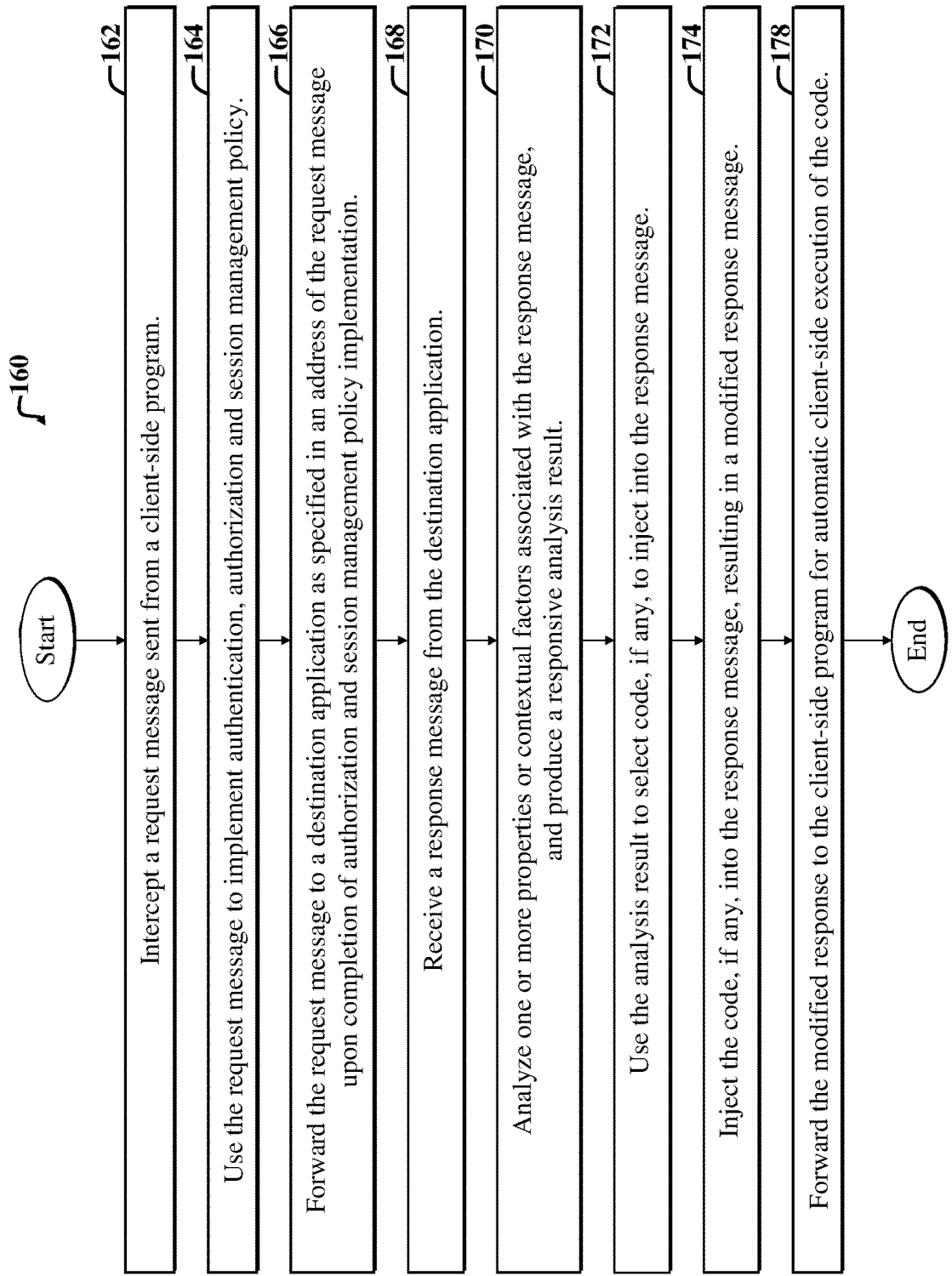
FIG. 10 is flow diagram of a third example method that is suitable for use with the embodiments of FIGS. 1-9.

FIG. 10 is flow diagram of a third example method 160 that is suitable for use with the embodiments of FIGS. 1-9. The third example method 160 facilitates automatic adjustment to a computing resource (e.g., the client-side program 16 of FIG. 1) of a networked computing environment (e.g., the environment or system 10 of FIG. 1).

A first step 162 includes intercepting a request message (e.g., the request message 60 of FIG. 4) sent from a client-side program.

A second step 164 includes using the request message to implement authentication, authorization and session management policy. For example, the policy may include configuration rules, authentication requirements, permissions to be allocated to a given set of authentication credentials (e.g., login credentials), and so on.

A third step 166 includes forwarding the request message to a destination application (e.g., the server-side application 20 of FIG. 1) as specified in an address of the request message upon completion of authorization and session management policy implementation checks.

A fourth step 168 includes receiving a response message from the destination application (e.g., the sever-side application 20 of FIG. 1).

A fifth step 170 includes analyzing (e.g., via the response message analyzer 44 of FIG. 2) via the one or more properties or contextual factors associated with the response message, and producing an analysis result in response thereto.

A sixth step 172 includes using the analysis result to select code to inject into the response message.

A seventh step 174 includes injecting the code, if any, into the response message, resulting in a modified response message.

An eighth step 176 includes forwarding the modified response to the client-side program for automatic client-side execution.

Note that the third example method 160 may be modified, without departing from the scope of the present teachings. For example, the third example method 160 may further specify that the client-side program includes a browser, and the first step 162 further includes using a Policy Enforcement Point (PEP) used to intercept the request message.

The code injected in the modified response message may include JavaScript that is configured to automatically execute client-side (e.g., as an extension or plugin) during runtime of the browser. The code may implement functionality, including functionality for detecting a browser-close event when the browser is closed, and issuing an asynchronous session-close call to the PEP or session manager in response to the detection of the browser-close event.

The fifth step 170 may further include referencing a set of configuration rules, wherein the configuration rules specify one or more conditions to be met for each set of available code to inject into the response message (e.g., as exemplified by Table 1 above); and using the one or more properties or contextual factors to check if the one or more conditions are met, wherein the one or more conditions are based on the existence, or lack thereof, of the one or more properties or contextual factors.

Figure 11:
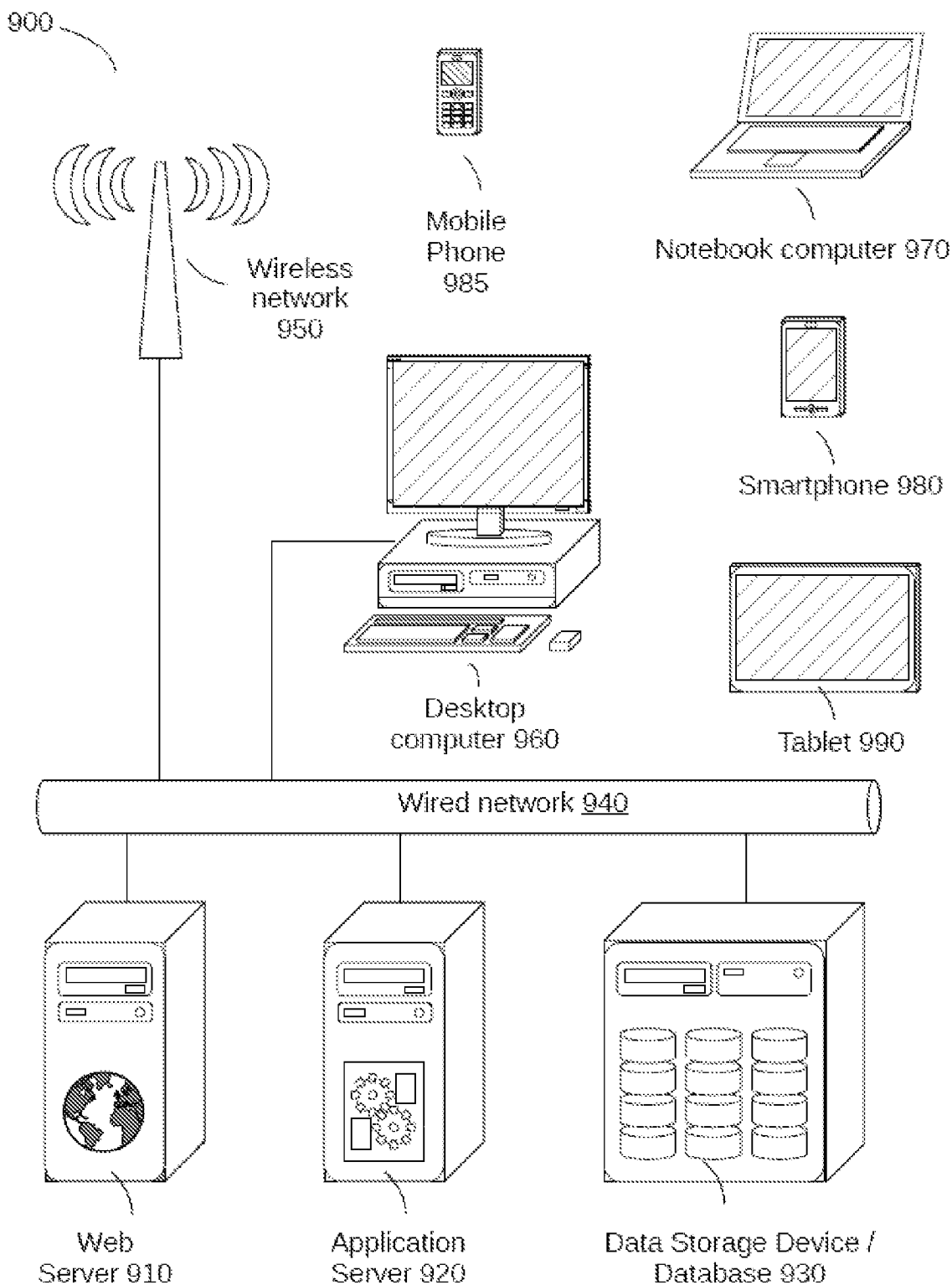
FIG. 11 is a general block diagram of a system and accompanying computing environment usable to implement the embodiments of FIGS. 1-10.

FIG. 11 is a general block diagram of a system 900 and accompanying computing environment usable to implement the embodiments of FIGS. 1-10. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 920, web server 910, and optionally database 930 can be combined into a single server computer application and system. In a further embodiment, virtualization and virtual machine applications may be used to implement one or more of the application server 920, web server 910, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 7, the client system(s) 12 of FIG. 1 may be implemented via one or more of the desktop computer 960, tablet 990, smartphone 980, notebook computer 970, and/or mobile phone 985 of FIG. 11. The server system 14 of FIG. 1 may be implemented via the web server 910 and/or application server 920 of FIG. 11.

In one example scenario, the server-side application 20 of FIG. 1 runs on an application server (e.g., the application server 920 of FIG. 11), but is accessible (to authenticated users and client-side software) via webpage code of a website hosted by the web server 910 of FIG. 11. The policy enforcement system 18 of FIG. 1 may run on the web server 910 of FIG. 11. The server-side application 20 of FIG. 1 that may run on the application server 920 of FIG. 11 may enable access to and use of data and functionality of the backend database 22 of FIG. 1, which may be maintained via the data storage device 930 of FIG. 11. The data storage device 930 of FIG. 11 may store so-called cloud-based data and may include backend databases accessible via software running on the application server 920.

Figure 12:
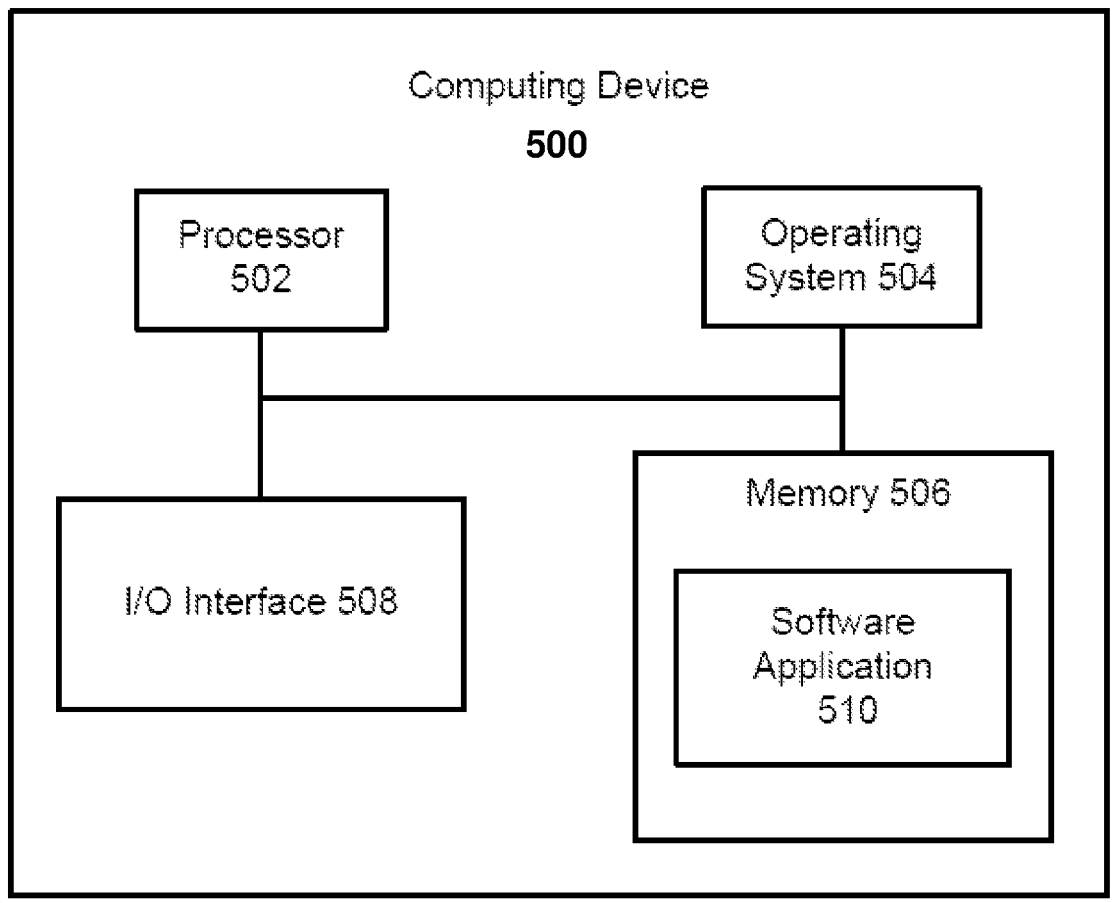
FIG. 12 is a general block diagram of a computing device usable to implement the embodiments of FIGS. 1-11.

FIG. 12 is a general block diagram of a computing device usable to implement the embodiments of FIGS. 1-11. While system 402 of FIG. 8 is described as facilitating performing the steps as described in certain implementations herein, any suitable component or combination of components of system 402 or any suitable processor or processors associated with system 402 may be used for performing the steps described.

FIG. 12 illustrates a block diagram of an example computing device 500, which may be used for implementations described herein. For example, computing device 500 may be used to implement server devices 910, 920 of FIG. 11 as well as to perform the method implementations described herein. In some implementations, computing device 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of device 500 or any suitable processor or processors associated with device 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing device 500 may be implemented by one or more processors or any combination of hardware devices, as well as any combination of hardware, software, firmware, etc.

For ease of illustration, FIG. 12 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing device 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain specific embodiments discussed herein are configured to facilitate the elimination of stale browser sessions via selective injection of code in response messages for client-side execution, embodiments are not limited thereto. For example, code or scripts injected into the response messages may be configured to perform other functions, such as implementing browser plugins to enhance network security, and so on. Furthermore, note that request messages may also be selectively modified (e.g., injected) with code for subsequent server-side execution.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable medium including instructions executable by one or more processors, and when executed operable for:
   intercepting a message in a computing environment, resulting in an intercepted message;
   analyzing the intercepted message in view of context information pertaining to the intercepted message and in view of one or more network policies, including one or more configuration rules;
   determining, based on the analyzing, code to inject into the intercepted message;
   injecting the code into the intercepted message, resulting in a modified message with injected code in response thereto;
   forwarding the modified message to a recipient identified by the intercepted message for automatic execution thereby;
   using a policy enforcement system to intercept the message, wherein the message includes a response message; and
   employing the injected code to facilitate automatic encoding of session information pertaining to a computing session between the recipient and a sender of the response message, wherein the automatic encoding is implemented via Time-based One Time Password (TOTP).

2. The non-transitory processor-readable medium of claim 1, wherein the intercepted message includes a response message to a client request message sent from a client-side application to a server-side application, and wherein the client-side application represents the recipient.

3. The non-transitory processor-readable medium of claim 2, wherein the code includes instructions to be automatically executed via the client-side application.

4. The non-transitory processor-readable medium of claim 3, wherein the client-side application includes a browser, and wherein the code includes JavaScript, and wherein execution of the code implements functionality for:
   detecting a browser-close event; and
   issuing a session-close signal to a session management system or policy enforcement system running server-side in response to the detecting.

5. The non-transitory processor-readable medium of claim 1, wherein the context information includes computing session metadata.

6. The non-transitory processor-readable medium of claim 5, wherein the computing session metadata includes information pertaining to a role associated with a sender of a request message to which the response message responds to.

7. The non-transitory processor-readable medium of claim 1, wherein the policy enforcement system includes a Policy Enforcement Point (PEP) with access to the one or more configuration rules, and wherein the one or more configuration rules include one or more associations identifying code to inject into the response message when a condition is met.

8. The non-transitory processor-readable medium of claim 7, further including determining when the condition is met by referring to the one or more configuration rules in combination with the context information.

9. A method for facilitating implementing dynamic run-time adjustment of computing code running in a computing environment, the method comprising:
    intercepting a message in a computing environment, resulting in an intercepted message;
    analyzing the intercepted message in view of context information pertaining to the intercepted message and in view of one or more network policies, including one or more configuration rules;
    determining, based on the analyzing, code to inject into the intercepted message;
    injecting the code into the intercepted message, resulting in a modified message with injected code in response thereto;
    forwarding the modified message to a recipient identified by the intercepted message for automatic execution thereby;
    using a policy enforcement system to intercept the message, wherein the message includes a response message; and
    employing the injected code to facilitate automatic encoding of session information pertaining to a computing session between the recipient and a sender of the response message, wherein the automatic encoding is implemented via Time-based One Time Password (TOTP).

10. The method of claim 9, wherein the intercepted message includes a response message to a client request message sent from a client-side application to a server-side application, and wherein the client-side application represents the recipient.

11. The method of claim 10, wherein the code includes instructions to be automatically executed via the client-side application.

12. The method of claim 11, wherein the client-side application includes a browser, and wherein the code includes JavaScript, and wherein execution of the code implements functionality for:
    detecting a browser-close event; and
    issuing a session-close signal to a session management system or policy enforcement system running server-side in response to the detecting.

13. The method of claim 9, wherein the context information includes computing session metadata.

14. The method of claim 13, wherein the computing session metadata includes information pertaining to a role associated with a sender of a request message to which the response message responds to.

15. The method of claim 9, wherein the policy enforcement system includes a Policy Enforcement Point (PEP) with access to the one or more configuration rules, and wherein the one or more configuration rules include one or more associations identifying code to inject into the response message when a condition is met.

16. The method of claim 15, further including:
    determining when the condition is met by referring to the one or more configuration rules in combination with the context information; and
    performing the employing of the injected code to facilitate the automatic encoding of the session information.

17. An apparatus comprising:
    one or more hardware processors; and
    logic encoded in one or more non-transitory media for execution by the one or more processors and when executed operable for:
        intercepting a message in a computing environment, resulting in an intercepted message;
        analyzing the intercepted message in view of context information pertaining to the intercepted message and in view of one or more network policies, including one or more configuration rules;
        determining, based on the analyzing, code to inject into the intercepted message;
        injecting the code into the intercepted message, resulting in a modified message with injected code in response thereto;
        forwarding the modified message to a recipient identified by the intercepted message for automatic execution thereby;
        using a policy enforcement system to intercept the message, wherein the message includes a response message; and
        employing the injected code to facilitate automatic encoding of session information pertaining to a computing session between the recipient and a sender of the response message, wherein the automatic encoding is implemented via Time-based One Time Password (TOTP).

\* \* \* \* \*

UNITED STATES PATENT AND TRADEMARK OFFICE
CERTIFICATE OF CORRECTION

PATENT NO. : 11,356,486 B2
APPLICATION NO. : 16/588406
DATED : June 7, 2022
INVENTOR(S) : Khanna et al.

It is certified that error appears in the above-identified patent and that said Letters Patent is hereby corrected as shown below:

On the Title Page

Column 2, under Item (57) Abstract, Line 11, delete "client side" and insert -- client-side --, therefor.

Column 2, under Item (57) Abstract, Line 17, delete "Time based" and insert -- Time-based --, therefor.

In the Specification

In Column 9, Line 34, delete "and or" and insert -- and/or --, therefor.

In Column 11, Line 30, delete "response-message" and insert -- response message --, therefor.

In Column 14, Line 44, delete "the the" and insert -- the --, therefor.

Signed and Sealed this
Twenty-first Day of February, 2023

Katherine Kelly Vidal
Director of the United States Patent and Trademark Office